United States Patent [19]
Wolf

[11] Patent Number: 5,903,573
[45] Date of Patent: May 11, 1999

[54] APPARATUS FOR REDUCING TRANSMISSION CAPACITY

[75] Inventor: Günter Wolf, Eberdingen, Germany

[73] Assignee: Alcatel Althom Compagnie Generale d'Electricite, Paris, France

[21] Appl. No.: 08/818,842

[22] Filed: Mar. 14, 1997

[30] Foreign Application Priority Data

Mar. 14, 1996 [DE] Germany ............................ 196 10 008

[51] Int. Cl.⁶ ............................... H04J 3/04; H04B 7/00
[52] U.S. Cl. ............................................ 370/535; 370/310
[58] Field of Search ..................................... 370/347, 260, 370/487, 468, 310, 358, 373, 377, 535, 538, 539, 542, 543, 904; 379/202, 93.23; 455/418, 456

[56] References Cited

U.S. PATENT DOCUMENTS

| | | | |
|---|---|---|---|
| 4,751,699 | 6/1988 | Tarridec et al. | 370/543 |
| 4,891,805 | 1/1990 | Fallin | 370/538 |
| 5,392,284 | 2/1995 | Sugiyama | 370/538 |
| 5,490,136 | 2/1996 | Sereno et al. | 370/18 |
| 5,533,027 | 7/1996 | Akerberg et al. | 370/195.1 |
| 5,581,555 | 12/1996 | Dubberly | 370/487 |
| 5,581,595 | 12/1996 | Iwashita et al. | 379/57 |
| 5,715,252 | 2/1998 | Sato | 370/543 |

FOREIGN PATENT DOCUMENTS 19610009  3/1996  Germany .

OTHER PUBLICATIONS

"Weniger ist oft mehr", C. Cavigioli et al, *Elektronik* 23/1992, pp. 138–141.

"Mikroelektronik in der Audiocodierung", K. Brandenburg, et al, *ME*, vol. 9, No. 1, 1995, pp. 24–27.

"Alcatel 9800" No. 941.07.00.43 B D IE, "Point to Multipoint Digital Microwave Radio Access System".

ITU–T G.726—Annex A (Nov. 1994), "General Aspects of Digital Transmission Systems", pp. 1–5.

*Primary Examiner*—Ajit Patel
*Assistant Examiner*—Chiho Andrew Lee
*Attorney, Agent, or Firm*—Ware, Fressola, Van Der Sluys & Adolphson LLP

[57] ABSTRACT

When signals are transmitted via an integrated services digital network (NET), the transmission capacity of the individual channels is predetermined. Two independent integrated services digital networks (NET) can be interconnected, for example via a radio link. However the radio link only has a limited number of channels available, and their transmission capacity is not predetermined. Before the signals of the first integrated services digital network (NET1) are converted into radio signals, the signals are routed to an apparatus (EIN) where they are compressed and divided. The apparatus (EIN) comprises a demultiplexer (DMUX) for demultiplexing the signals to the individual bearer and signalling channels, a switching unit (S) for separately routing signals to be compressed, e.g. voice signals, and signals not to be compressed, e.g. data signals, an encoding unit (K) in which the signals to be compressed are encoded, a multiplexer (MUX) for joining the encoded, not to be compressed, signalling and packet-switched data signals, and a control unit ($\mu P$) for controlling the switching unit (S) as a function of the contents of the signalling signals, and to separately route the signals in the signalling channels onward to transmission channels with different transmission capacities.

10 Claims, 2 Drawing Sheets

APPARATUS FOR REDUCING TRANSMISSION CAPACITY

BACKGROUND OF THE INVENTION

1. Technical Field

The invention concerns an apparatus for reducing the transmission capacity required to transmit signals in bearer channels and in signalling channels of an integrated services digital network.

2. Description of the Related Art

When signals are transmitted via an integrated services digital network, a so-called ISDN, the transmission capacities of the individual channels are predetermined and cannot be changed. A bearer channel for transmitting voice and data signals, the so-called B-channel has a transmission capacity of 64 kbit/s. A channel for transmitting signalling signals, the so-called D-channel has a transmission capacity of 16 kbit/s. Standardized transmission in the basic access configuration provides for two B-channels and one D-channel. Two independent integrated services digital networks can be interconnected via a radio link for example. Only a limited number of channels are available in the radio link. The transmission capacity of the individual channels is not predetermined.

Alcatel's 1994 product brochure "Alcatel 9800" describes a subscriber access system whereby a digital telephone network can be connected to another digital telephone network and/or to a radio network. 1024 terminal stations for example can be connected to the digital telephone network via 30 transmission channels of 64 kbit/s each, or via 60 transmission channels of 32 kbit/s each. The distribution into 30 or 60 transmission channels is predetermined. The system which contains 60 transmission channels operates in accordance with the method of adaptive differential pulse code modulation, which can be found for example in ITU-T recommendation G. 726, and only supports voice services. An ISDN link for a basic access configuration requires two 64 kbit/s channels and one 16 kbit/s channel to support all ISDN service features. These channels must be provided via radio.

SUMMARY OF THE INVENTION

It is therefore the task of the invention to transmit signals via an integrated services digital network in a more flexible manner.

According to the present invention, an apparatus for reducing the transmission capacity required to transmit signals in bearer channels and signaling channels of an integrated services digital network comprises a demultiplexer for demultiplexing the signals, a control unit for routing the signals in the signaling channels onward separately in transmission channels with different transmission capacities, and a multiplexer for multiplexing the bearer channels and the occupied transmission channels.

In further accord with the invention, the apparatus is characterized in that it further comprises a simulation unit for simulating a number of terminal stations or an exchange, and that by means of the simulation unit, supervisory signals are transmitted in the signaling channels.

In still further accord with the invention, the apparatus is characterized in that it comprises an encoding unit for encoding signals to be compressed in the bearer channels and a switching unit whereby the signals to be compressed or the encoded signals and the signals not to be compressed are routed onward separately, and that the switching unit is controllable by the control unit in accordance with the contents of the signals in the signaling channels.

Further still in accord with the invention, the apparatus is characterized in that the encoding unit comprises a number of voice encoders, and that the voice signals are routed via the switching unit to the encoding unit and data signals are routed via the switching unit to the multiplexer.

In still further in accord with the present invention, the apparatus is characterized in that information on current occupancy of the transmission channels is transmitted over an additional channel generated in the control unit.

Further in accord with the invention, the apparatus is characterized in that it further comprises a decoding unit for decoding compressed signals and a switching unit whereby decoded signals or signals to be decompressed, and signals not to be decompressed are routed onward separately, and that the switching unit is controllable by the control unit.

According still further to the present invention, an apparatus is characterized by being used in a radio station.

A particular advantage of the invention is that with a predetermined number of transmission channels, more terminal stations able to utilize ISDN service features can be connected to an integrated services digital network.

Another advantage of the invention is its compatibility with standardized modulating schemes, such as the adaptive differential pulse code modulation.

These and other objects, features and advantages of the present invention will become more apparent in light of the detailed description of a best mode embodiment thereof, as illustrated in the accompanying drawing.

BRIEF DESCRIPTION OF THE DRAWING

The invention is explained in the following by means of a configuration example with the help of FIGS. 1 to 3, where.

DESCRIPTION OF THE PREFERRED EMBODIMENTS

Figure 1:
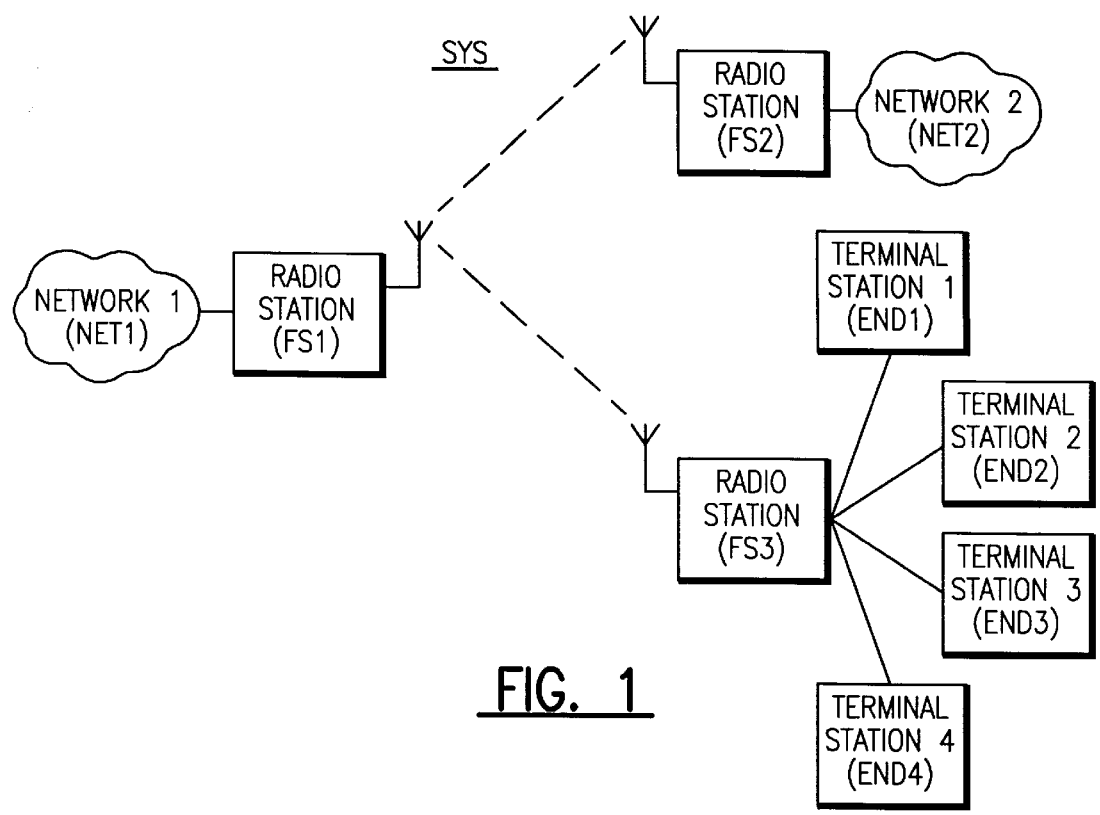
FIG. 1 is a schematic illustration of a transmission system according to the invention.

The configuration example is first explained by means of FIG. 1 which illustrates a transmission system SYS according to the invention. The transmission system SYS comprises an integrated services digital network NET1, the so-called ISDN, which is connected via a point-to-multipoint connection to another network NET2, and to four terminal stations END1 and END4 for example.

In the integrated services digital network NET1, signals are transmitted via bearer channels, the so-called B-channels, and via signalling channels, the so-called D-channels. The signals are voice, data, signalling and packet-switched data signals. The voice and data signals are transmitted in the bearer channels, the signalling and the packet-switched data signals are transmitted in the signalling channels. In a basic access configuration a terminal station has available two B-channels with 64 kbit/s transmission capacity each, and one D-channel with 16 kbit/s transmission capacity. The channel transmission capacity is predetermined.

The point-to-multipoint connection is preferably a radio connection but can also be a glass, i.e., optical fiber or a coaxial cable connection. The integrated services digital network NET1 is connected to a radio station FS1. In the radio station the signals that are transmitted via the integrated services digital network NET1 are converted into radio signals. The radio signals are transmitted via channels with variable transmission capacity. The radio signals are simultaneously transmitted to two further radio stations FS2 and FS3, which determine the signals intended for them from the transmitted radio signals by means of the time-division multiplex method. The transmission via radio signals is an advantage in rugged terrains, e.g. in mountains, or with international linkups. The radio signal are transmitted for example via radio relay links.

Voice signals which are transmitted via the integrated services digital network NET1 are compressed in the radio station FS1 before being converted into radio signals. The signalling channels are distributed to transmission channels with different transmission capacities. This takes place in a unit for reducing the transmission capacity and for compressing signals, which is described in more detail in the text relating to FIG. 2. The reduction of the transmission capacity and the compression of the signals are used to increase the number of channels in the radio transmission path while maintaining the availability of all ISDN service features.

The radio station FS2 is used to convert the received radio signals, decompress them, adapt them to the predetermined transmission capacity and then route them to the network NET2. The adaptation takes place inversely to the reduction. The network NET2 is a further integrated services digital network for example.

The radio station FS3 is used to convert the received radio signals, decompress them, adapt them to the predetermined transmission capacity and then route them to the four terminal stations END1 to END4. The adaptation takes place inversely to the reduction. The four terminal stations END1 to END4 are ISDN-capable terminal stations for example.

The signals transmitted via the network NET2 are compressed in the radio station FS2, they are divided and converted into radio signals and are then transmitted with the radio signals of radio station FS3 to radio station FS1 by means of the time-division multiplex method. The radio signals of radio station FS3 originate from the signals emitted by the terminal stations END1 to END4, which were previously compressed and divided. In this way every terminal station of a network is able to communicate with every other terminal station of another network.

Compression of the signals takes place according to the method of adaptive differential pulse code modulation described in the ITU-T recommendation G. 726 for example, or according to any other compression method.

Figure 2:
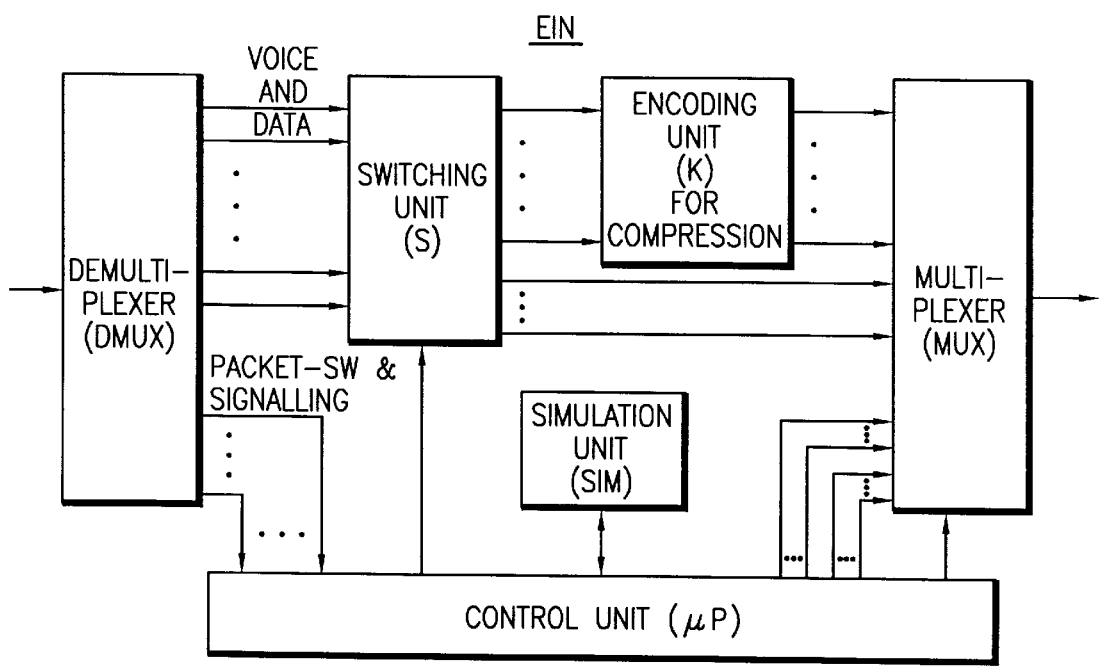
FIG. 2 is a schematic illustration of an apparatus according to the invention for reducing transmission capacity and for compressing signals.

The configuration example is now explained further by means of FIG. 2, which illustrates an apparatus EIN of the invention for reducing the transmission capacity required to transmit signals in bearer channels and in signalling channels of an integrated services digital network, and for compressing the signals containing voice, data and signalling signals. The apparatus EIN comprises a demultiplexer DMUX, a simulation unit SIM, a switching unit S, an encoding unit K, a multiplexer MUX and a control unit $\mu$P.

The apparatus EIN can be used in every one of the radio stations in FIG. 1. To simplify the illustration of the invention the apparatus is used only for compressing and not for decompressing. For this reason the apparatus EIN can only be used for unidirectional operation.

The demultiplexer DMUX is used to demultiplex the signals that are transmitted via the integrated services digital network. The signals are divided into the individual bearer channels with 64 kbit/s each and into the individual signalling channels with 16 kbit/s each. The voice and data signals in the bearer channels are routed to the switching unit S. The signalling and the packet-switched data signals in the signalling channels are routed to the control unit $\mu$P.

The control unit $\mu$P includes several switching elements that are controlled by the control unit $\mu$P, whereby the signals to be compressed and the signals not to be compressed can be routed onward. The signals to be compressed are routed to the encoding unit K. The not to be compressed signals are routed to the multiplexer MUX.

The encoding unit K is used to encode the signals to be compressed. It contains an encoder for each bearer channel whereby signals are encoded according to the method of adaptive differential pulse code modulation and can be compressed in this way. The signals to be compressed are voice signals for example in which no significant voice quality deterioration takes place when they are compressed from 64 kbit/s to 32 kbit/s. The encoded signals are routed to the multiplexer MUX.

The multiplexer MUX is used to multiplex the encoded and not to be compressed signals, as well as the signalling and the packet-switched signals. The encoded signals are voice signals for example, the not to be compressed signals are data signals for example.

The control unit $\mu$P is a microprocessor or a digital signal processor for example. It is used to control the switching unit S of the multiplexer MUX, as well as to separately route onward the signalling and packet-switched signals to the multiplexer MUX via transmission channels with different transmission capacities.

From the contents of the signals in the signalling channels, the control unit $\mu$P determines the required transmission capacities for these signals and derives the suitable transmission channels from them. If a terminal station for example requests a voice link to be established, this is recognized by the control unit $\mu$P and a transmission channel with a transmission capacity of 2 kbit/s for example is occupied for the establishment, maintenance and clearance of the connection. If a terminal station requests the establishment of a data connection in a bearer channel for example, a transmission channel with a transmission capacity of 2 kbit/s is also occupied for the signalling signals for example. However if the transmission of packet-switched data signals in a signalling channel is requested, depending on the data traffic the packet-switched data signals are routed to a transmission channel with a transmission capacity of 16 kbit/s for example. The occupied bearer channels and the occupied transmission channels are then multiplexed by the control unit $\mu$P in the multiplexer MUX.

Information is also exchanged between terminal stations and the pertinent exchange without signalling and packet-switched data signals. This information is transmitted in the form of supervisory signals. The supervisory signals for example contain the current clock time, the current date and the information whether or not terminals are connected to the respective terminal station. To prevent having to transmit the transmission signals before the terminal stations via the radio link to the next exchange and vice versa, thereby needlessly occupying the transmission capacity, the corresponding supervisory signals of the exchange or the terminal stations are simulated in the simulation unit SIM. The particular simulation unit SIM which is connected to an exchange via an integrated services digital network simulates the supervisory signals of the terminal stations, for example the information whether any terminals are connected thereto. This can be programmed with software from the control unit µP, or it can be done with an actual terminal that is connected to the control unit µP. The particular simulation unit SIM connected to the terminal stations via an integrated services digital network simulates the supervisory signals of the exchange, for example the transmission of the current clock time and the current date. This can be accomplished with an oscillator and a counter for example. Only in case of an error is a connection established to the real exchange and the faulty supervisory signals are transmitted. The clock time can also be centrally transmitted in an additional channel with a low transmission capacity.

The control signals for the switching elements (see FIG. 3 for an example) of switching unit S are derived by the control unit µP from the contents of the signalling signals. If a terminal station requests the establishment of a voice link for example, this is recognized by the control unit µP and the switching element for the pertinent bearer channel is switched in such a way that the signals in the bearer channel are routed to the encoding unit K. By contrast, if a terminal station requests the establishment of a data link, the switching element for the pertinent bearer channel is switched in such a way that the signals in the bearer channel go directly to the multiplexer MUX without any further processing. When the encoded voice signals are decompressed at the receiving end, the information about how the respective switching elements are currently controlled must be known. This information is also derived at the receiving end for example from the contents of the signalling signals. As an alternative, the information can be added with the current control information from the control unit µP to the signalling signals, and transmitted with them. Another alternative is to generate an additional channel in the control unit µP. The current control information is then transmitted in this additional channel. The additional channel is multiplexed together with the other channels in multiplexer MUX. The information about the current occupation of the transmission channels can also be transmitted via the additional channel.

The compression of the signals therefore includes a flexible on-demand division and compression which supports all ISDN service features. ISDN bearer channels are only made available as necessary in order to minimize the transmission capacity of the radio link.

To finalize the description, the configuration example will now be explained by means of FIG. 3, which illustrates an apparatus EIN according to the invention for reducing transmission capacity and for compressing and decompressing signals. The apparatus EIN is used to compress and divide signals which were transmitted via an integrated services digital network and contain voice, data and signalling signals, and to decompress and adapt signals which were transmitted as radio signals for example and can therefore be used for the bidirectional operation of every radio station in FIG. 1.

The apparatus EIN comprises two conversion units UM1, UM2, a switching unit S, an encoding-decoding unit KD, a control unit µP and a simulation unit SIM.

The conversion unit UM1 comprises a demultiplexer for demultiplexing the signals which were transmitted via the integrated services digital network, and a multiplexer for multiplexing the signals which were transmitted as radio signals. The function and manner of operation of the demultiplexer corresponds to the demultiplexer in FIG. 2. During the decompression and adaptation, the multiplexer joins the bearer and signalling channels that were divided by the demultiplexer.

The switching unit S comprises several switching elements SC1 to SCN, one switching element SC for each bearer channel. The function and manner of operation of the switching unit S corresponds to the switching unit in FIG. 2. The signals that will not be compressed are routed to the conversion unit UM2, the signals that will be compressed are routed to the encoding-decoding unit KD.

The encoding-decoding unit KD comprises several voice encoders-decoders CODEC1 to CODECN, on voice encoder-decoder CODEC for each bearer channel. The encoding-decoding unit KD is used to compress and decompress voice signals. The encoded and compressed voice signals are routed to the conversion unit UM2. The voice encoders-decoders CODEC1 to CODECN operate in accordance with the method of adaptive differential pulse code modulation for example.

The conversion unit UM2 comprises a multiplexer for multiplexing the encoded and not to be compressed signals as well as the signalling and the packet-switched data signals, which were all transmitted via the integrated services digital network. The function and manner of operation of the multiplexer corresponds to the multiplexer in FIG. 2. The conversion unit UM2 furthermore includes a demultiplexer for demultiplexing the signals which were transmitted as radio signals. The apparatus EIN works in full duplex mode so that the channels at the multiplexer input are equal to the channels at the demultiplexer output.

The control unit µP is a microprocessor or a digital signal processor for example. It is used to control the switching unit S, the conversion unit UM1 and the conversion unit UM2, as well as to separately route the signalling and packet-switched signals prior to their conversion into radio signals, and to adapt the transmission channels with the different transmission capacities to the signalling channels with the predetermined 16 kbit/s transmission capacity for each signalling channel. The control of the switching elements SC1 to SCN and the transmission of the information via their current control takes place as described for FIG. 2.

The method of compressing and dividing signals corresponds to the one described for FIG. 2. For that reason they will not be described further.

The method of adapting signals is described in the following. The received radio signals are converted and routed to the demultiplexer in conversion unit UM2, where they are divided into the respective bearer and supervisory channels. The control unit µP determines the current occupation of the transmission channels, for example form the signals in the additional channel. The signals in the transmission channels with 2 kbit/s and 16 kbit/s are transmitted to the pertinent signalling channels with 16 kbit/s each under the control of control unit µP.

The signal decompression method is described in the following. The received radio signals are converted into electrical signals and routed to the demultiplexer in conversion unit UM2. In the demultiplexer they are divided into the respective bearer and transmission channels. The signals in the first bearer channel travel for example via the encoder-decoder CODEC1 and in parallel via a connecting line to the switching element SC1, which is controlled so that either the signals decoded and decompressed in the encoder-decoder CODEC1, or the not decoded signals of the connecting line are routed onward. The control of the switching element SC1 takes place via the control unit µP in which the information for the current control is obtained from the pertinent signalling signals, the additional signals or from the signals in the additional channel.

The configuration example in FIG. 2 illustrates an apparatus for compressing signals. The switching unit is arranged before the encoding unit. The switching unit can also be arranged behind the encoding unit instead of before. To that end each bearer channel in the demultiplexer must be divided into two separate connecting lines. This saves wiring effort, among other things. An apparatus for decompressing signals can be derived form the apparatus for compressing signals if the encoding unit is replaced with a decoding unit. Both variations of arranging the apparatus for decompressing signals are possible, with the switching unit before and behind the decoding unit.

Figure 3:
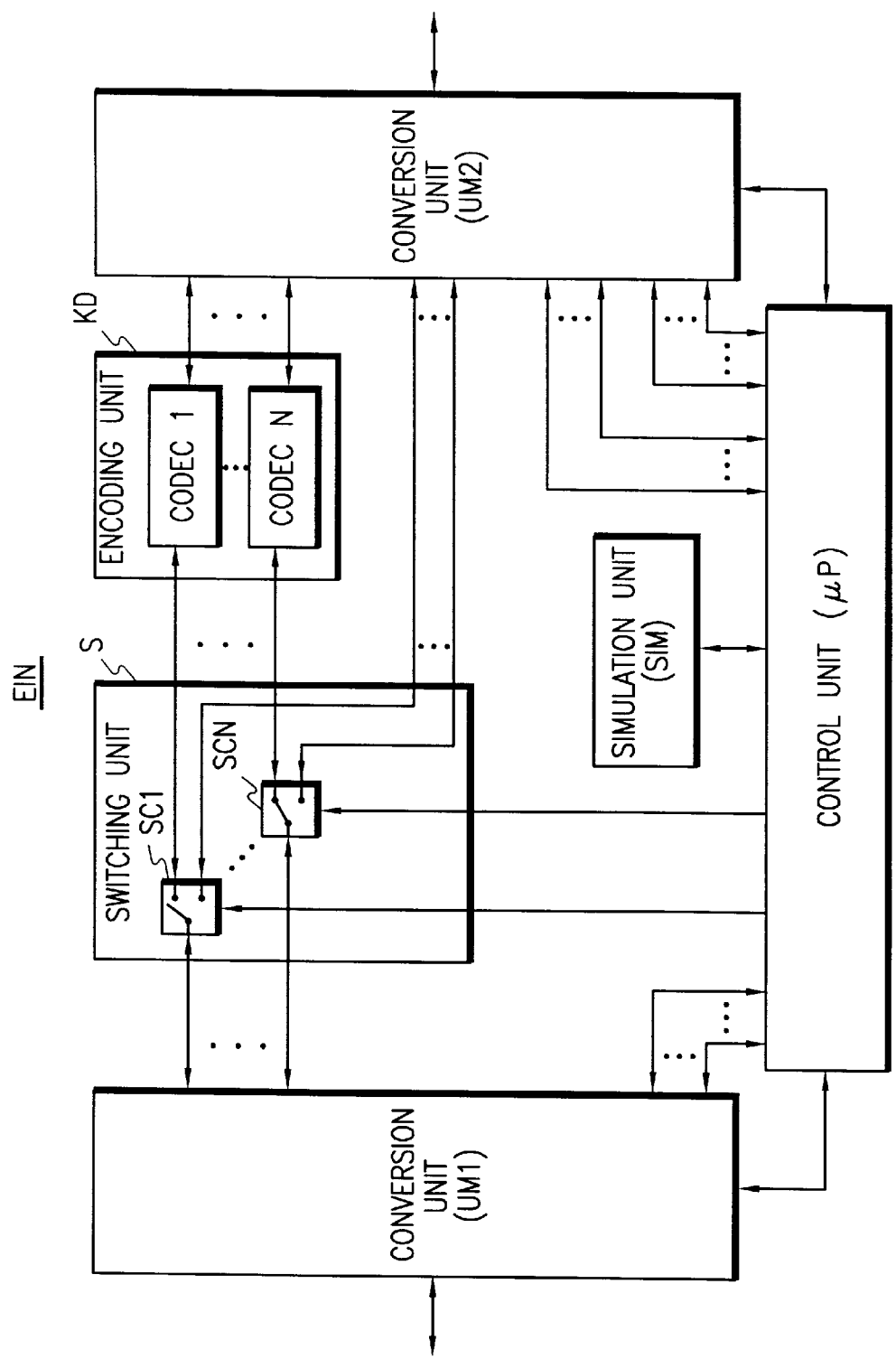
FIG. 3 is a schematically illustrated construction of an apparatus according to the invention for reducing transmission capacity and for compressing and decompressing signals.

The configuration example in FIG. 3 illustrates an apparatus for compressing and decompressing signals in a duplex operation. Instead of one apparatus, two can be used as described above, one for compressing and one for decompressing. All the devices may require delay elements for reasons of synchronization or running time differences, which are not described further.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An apparatus (EIN) for reducing the transmission capacity required to transmit signals in bearer channels and signals in signaling channels of an integrated services digital network (NET1) said apparatus (EIN) comprising a demultiplexer (DMUX, UM1) for demultiplexing the signals in the bearer channels and in the signaling channels, a control unit ($\mu$P) for routing the signals in the signaling channels onward separately in transmission channels with different transmission capacities, and a multiplexer (MUX, UM2) for multiplexing the bearer channels and the signal channels occupying the transmission channels with different transmission capacities characterized in that it comprises an encoding unit (K, KD) for encoding signals to be compressed in the bearer channels and a switching unit (S) whereby the signals to be compressed or the encoded signals and the signals not to be compressed are routed onward separately, and that the switching unit (S) is controllable by the control unit ($\mu$P) in accordance with the contents of the signals in the signaling channels.

2. The apparatus (EIN) as claimed in claim 1, further comprising a simulation unit (SIM) for simulating a number of terminal stations or an exchange, and that by means of the simulation unit (SIM), supervisory signals are transmitted in the signaling channels.

3. An apparatus (EIN) as claimed in claim 1, characterized in that the encoding unit (K) comprises a number of voice encoders (CODEC), and that voice signals are routed via the switching unit (S) to the encoding unit (K, KD) and data signals are routed via the switching unit (S) to the multiplexer (MUX, UM2).

4. The apparatus as claimed in claim 1, wherein information on current occupancy of the transmission channels is transmitted over an additional channel generated in the control unit ($\mu$P).

5. The apparatus (EIN) as claimed in claim 1, wherein said apparatus is for use in a radio station (FS).

6. An apparatus (EIN) as claimed in claim 1, characterized in that it further comprises a decoding unit (KD) for decoding compressed signals and a switching unit (S) whereby decoded signals or signals to be decompressed, and signals not to be decompressed are routed onward separately, and that the switching unit (S) is controllable by the control unit ($\mu$P).

7. An apparatus (EIN) as claimed in claim 6, characterized in that it further comprises a simulation unit (SIM) for simulating a number of terminal stations or an exchange, and that by means of the simulation unit (SIM), supervisory signals are transmitted in the signaling channels.

8. An apparatus (EIN) as claimed in claim 7, characterized by being used in a radio station (FS).

9. An apparatus (EIN) as claimed in claim 8, characterized in that information on current occupancy of the transmission channels is transmitted over an additional channel generated in the control unit ($\mu$P).

10. An apparatus (EIN) for reducing the transmission capacity required to transmit signals in bearer channels and signals in signaling channels of an integrated services digital network (NET1) said apparatus (EIN) comprising a demultiplexer (DMUX, UM1) for demultiplexing the signals in the bearer channels and in the signaling channels, a control unit ($\mu$P) for routing the signals in the signaling channels onward separately in transmission channels with different transmission capacities, and a multiplexer (MUX, UM2) for multiplexing the bearer channels and the signal channels occupying the transmission channels with different transmission capacities characterized in that it further comprises a decoding unit (KD) for decoding compressed signals and a switching unit (S) whereby decoded signals or signals to be decompressed, and signals not to be decompressed are routed onward separately, and that the switching unit (S) is controllable by the control unit ($\mu$P).

* * * * *

UNITED STATES PATENT AND TRADEMARK OFFICE
CERTIFICATE OF CORRECTION

PATENT NO.  : 5,903,573
DATED       : May 11, 1999
INVENTOR(S) : G. Wolf

It is certified that error appears in the above-identified patent and that said Letters Patent is hereby corrected as shown below:

at line 9 (claim 4, line 1), after "apparatus", insert --(EIN)--;

at line 33 (claim 10, line 1), cancel "An" and substitute --The--;

at line 42 (claim 10, line 10), cancel "the bearer channels and", and cancel "signal" and substitute --signaling--; and at line 44 (claim 10, line 12), cancel "characterized in that", and cancel "comprises" and substitute --comprising-- therefor.

Signed and Sealed this

Twenty-eighth Day of December, 1999

Attest:

Q. TODD DICKINSON

*Attesting Officer*      *Acting Commissioner of Patents and Trademarks*